United States Patent [19]
Uno et al.

[11] 3,870,724
[45] Mar. 11, 1975

[54] PROCESS FOR PREPARING PYRIDOXAL-5'-MONOPHOSPHATE

[75] Inventors: Hitoshi Uno, Takatsuki-shi; Akira Irie, Hirakata-shi, both of Japan

[73] Assignee: Dainippon Pharmaceutical Co. Ltd., Osaka, Japan

[22] Filed: Mar. 7, 1969

[21] Appl. No.: 805,345

[30] Foreign Application Priority Data
 Mar. 12, 1968  Japan.............................. 43-16124
 Mar. 13, 1968  Japan.............................. 43-16381

[52] U.S. Cl....................... 260/297 V, 260/270 PY
[51] Int. Cl............................................. C07d 31/32
[58] Field of Search.................... 260/297 V, 270 R

[56] References Cited
UNITED STATES PATENTS
3,644,383  2/1972  Utsumi.......................... 260/297 V FOREIGN PATENTS OR APPLICATIONS
1,912,602  10/1969  Germany........................ 260/297 V
45-39266  11/1970  Japan........................... 260/297 V Primary Examiner—Donald G. Daus
Attorney, Agent, or Firm—Bierman & Bierman

[57] ABSTRACT

The process comprises treating a mineral acid salt of pyridoxal or pyridoxal hydroxysulfonic acid with a metal salt selected from the group consisting of chlorides, sulfates and carbonates of magnesium, zinc, calcium, barium, manganese, cobalt, nickel, cadmium, copper, iron, mercury and aluminum and an amine selected from the group consisting of lower alkylamines, cyclo(lower)-alkylamines, ar(lower)-alkylamines and arylamines in water, a lower alkanol or their mixture. The pH of the resulting mixture is adjusted within a range from about 7 to 10, and the collected pyridoxal Schiff's base metal chelate is treated with a phosphorylating agent. The resultant mixture and water are heated and the product is isolated from the resulting mixture. The process of the invention is advantageous in allowing pyridoxal-5'-monophosphate to be produced from readily available and economical starting materials in an excellent yield by simple operations.

10 Claims, No Drawings

PROCESS FOR PREPARING PYRIDOXAL-5'-MONOPHOSPHATE

The present invention relates to an improved process for preparing pyridoxal-5'-monophosphate and an intermediate thereof. The pyridoxal-5'-monophosphate has an activity similar to vitamin $B_6$ and consequently it can be used as a substitute therefor.

Hitherto, there have been reported some methods for the preparation of pyridoxal-5'-monophosphate. These known methods can be classified into two groups, i.e. (1) the ones comprising oxidation of pyridoxamine-5'-phosphate and (2) the ones comprising phosphorylation of the pyridoxal protected at the formyl group, followed by the elimination of the protective group. Of these methods, the former are industrially disadvantageous, and therefore the latter are generally and preferably adopted. Representative of the latter methods are the following two procedures: (A) the procedure via the pyridoxal oxazolidine prepared from pyridoxal and a β-aminoalcohol such as ephedrine (U.S. Pat. No. 3,124,587); and (B) the procedure via the Schiff's base of pyridoxal prepared from pyridoxal and an amine (British Patent No. 1,074,885). In procedure (A), the pyridoxal oxazolidine is phosphorylated, large amounts of ethanol and of ether are added, in that order, and the separated oily substance is hydrolyzed with a mineral acid. The use of large amounts of organic solvents are clearly uneconomical. The use of such an expensive β-aminoalcohol as ephedrine is also uneconomical. A further disadvantage is that the hydrolysis requires a mineral acid. In procedure (B), the Schiff's base of pyridoxal is phosphorylated, the resulting polyphosphoric acid ester is hydrolyzed with a mineral acid and the resultant monophosphoric acid ester is, after isolation, subjected to hydrolysis with an alkali. However, the production of the Schiff's base in a pure state is somewhat difficult. Further, two steps of hydrolysis are required which entail somewhat troublesome operations. Furthermore, pyridoxal-5'-monophosphate is relatively unstable in the presence of alkali and, therefore, the hydrolysis with an alkali necessarily results in depressing the yield.

Generally speaking, a method for the preparation of pyridoxal-5'-monophosphate which comprises phosphorylation of the pyridoxal protected at the formyl group and elimination of the protective group in the resulting product is desired. Such method should satisfy the following requirements: (1) the pyridoxal protected at the formyl group should be easily isolated from the reaction mixture, particularly the aqueous solution; (2) the protective group at the formyl group should be sufficiently stable so as to be resistant to the phosphorylation; and (3) the protective group should be readily eliminated after the phosphorylation.

It has now been found that a metal chelate of the Schiff's base of pyridoxal, i.e. a pyridoxal Schiff's base metal chelate, is an excellent intermediate in the production of pyridoxal-5'-monophosphate. The use of said chelate satisfies all of the above-mentioned requirements and pyridoxal-5'-monophosphate can be produced via the metal chelate with numerous advantages. For example, the metal chelate is quite readily prepared by treatment of pyridoxal with a specified amine and a suitable metal salt. When the pH is appropriately adjusted, it can be separated with facility from the reaction mixture. The chelating bond is not affected during phosphorylation and, after phosphorylation, is fissioned readily by a simple operation such as heating the phosphorylation reaction mixture with water. It should be noted that the metal chelate is protected not only at the formyl group but also at the hydroxyl group on the 3-position so that phosphorylation proceeds only at the 5'-position. Since hydrolysis with a mineral acid or an alkali is not required, the yield of pyridoxal-5'-monophosphate is excellent.

According to the present invention, the pyridoxal-5'-monophosphate is prepared by treating a mineral acid salt of pyridoxal or pyridoxal hydroxysulfonic acid with a metal salt and an amine, in water, a lower alkanol or their mixture, adjusting the pH of the resulting mixture within a range from about 7 to 10, treating the collected pyridoxal Schiff's base metal chelate with a phosphorylating agent, heating the resultant mixture with water and isolating the product from the resulting mixture.

In the first step, a mineral acid salt of pyridoxal such as pyridoxal hydrochloride or pyridoxal hydroxysulfonic acid is dissolved or suspended in water, a lower alkanol such as methanol or ethanal or their mixture, and a metal salt (about a half mol to 1 mol of pyridoxal) and an amine (not less than 1 mol, preferably about 2 mol, to 1 mol of pyridoxal) are added. Then, the reaction is carried out usually at a room temperature and sometimes while cooling. As the metal salt, there is used one selected from the group consisting of chlorides, sulfates and carbonates of magnesium, zinc, calcium, barium, manganese, cobalt, nickel, cadmium, copper, iron, mercury and aluminum. Of these, the use of a nickel salt, particularly nickel chloride ($NiCl_2$), is recommended from the viewpoint of high separability of the metal chelate. As the amine, there is employed one selected from the group consisting of lower alkylamines (e.g. methylamine, ethylamine, propylamine, butylamine), cyclo-(lower)-alkylamines (e.g. cyclohexylamine), ar(lower)alkylamines (e.g. benzylamine, phenethylamine) and arylamines (e.g. aniline). Of these, the use of a lower alkylamine, especially ethylamine, is preferred for the same reason as for nickel chloride.

In the second step, the reaction mixture obtained above is adjusted to a pH from about 7 to 10 whereby the metal chelate is precipitated. For the adjustment of pH, excess of the said amine may be employed. But, the use of a dilute alkaline solution such as a dilute aqueous solution of alkali metal hydroxide is usually favored. The precipitated metal chelate is collected by a conventional separation procedure such as filtration and dried preferably to a substantially anhydrous state.

In the third step, the metal chelate is dissolved in a quantity of a phosphorylating agent up to 10 times the amount of metal chelate, and the resultant solution is subjected to a phosphorylation reaction at about room temperature to 100°C, (preferably about 40° to 80°C), for a period up to 10 hours. As the phosphorylating agent, there may be used a mixture of phosphoric acid and phosphoric acid anhydride, a mixture of phosphoric acid anhydride and water, metaphosphoric acid, a mixture of phosphorus oxychloride and water, tetrachloropyrophosphoric acid or the like.

In the fourth step, the phosphorylation reaction mixture and water are heated to a temperature from about 50° to 100°C for a period of up to 10 minutes so that hydrolysis proceeds to cut off the chelating bond as well as the pyrophosphoric acid ester bond.

In the fifth step, the reaction mixture obtained above is adsorbed on a cation exchange resin and eluted with water. The eluate is concentrated under reduced pressure, and the separated crystals of pyridoxal-5'-monophosphate are collected. As the cation exchange resin, a strongly acidic cation exchange resin of sulfonic acid type such as Dowex 50W (manufactured by Dow Chemical Co.) or Amberlite IR 120 (manufactured by Rohm & Hass Co.) is ordinarily employed.

Compared with conventional methods, the process of this invention as illustrated above is advantageous in affording pyridoxal-5'-monophosphate from readily available and economical starting materials in an excellent yield by simple operations.

Practical and presently-preferred embodiments of the present invention are illustratively shown in the following examples.

PART A

Preparation of metal chelate of Schiff's base of pyridoxal:

EXAMPLE 1

To a mixture of pyridoxal hydroxysulfonic acid (2.49 g) and nickel chloride (1.2 g) in water (20 ml), there is added a solution of aniline (2 g) in a small amount of ethanol, and the resultant mixture is adjusted to pH 8 with dilute sodium hydroxide solution. The dark yellow precipitate is collected by filtration, washed with water and ethanol in order and dried to give pyridoxylideneaniline nickel chelate (1.8 g).

Anal. Calcd. for $C_{28}H_{26}N_4O_4Ni$: C, 62.13; H, 4.84; N, 10.35; Ni, 10.84. Found: C, 61.92; H, 5.05; N, 10.33; Ni, 11.20.

EXAMPLE 2

To a mixture of pyridoxal hydrochloride (2.03 g) and nickel chloride (1.2 g) in water (10 ml), there is added 70 % aqueous solution of ethylamine (1.5 g), and the resultant mixture is adjusted to pH 7 with dilute sodium hydroxide solution. The dark green precipitate is collected by filtration, washed with water and ethanol in order and dried to give pyridoxylideneethylamine nickel chelate (2.5 g).

Anal. Calcd. for $C_{20}H_{26}N_4O_4Ni$: C, 53.96; H, 5.89; N, 12.59; Ni, 13.18. Found: C, 53.63; H, 5.95; N, 12.38; Ni, 13.17.

EXAMPLE 3

To a mixture of pyridoxal hydrochloride (2.30 g) and nickel chloride (1.2 g) in water (10 ml), there is added benzylamine (3 g). The resultant mixture is treated as in Example 2 to give pyridoxylidenebenzylamine nickel chelate (2.6 g) as green material.

Anal. Calcd. for $C_{30}H_{30}N_4O_4Ni$: C, 63.29; H, 5.31; N, 9.84; Ni, 10.31. Found: C, 63.39; H, 5.34; N, 9.54; Ni, 10.37.

In a similar manner, there are produced the following metal chelates of Schiff's base of pyridoxal: pyridoxylidenephenethylamine copper chelate, yellowish green; pyridoxylidenephenethylamine iron (Fe+++) chelate, brown; pyridoxylidenecyclohexylamine mercury chelate, cream; pyridoxylidenebutylamine cadmium chelate, yellowish brown; pyridoxylidenebutylamine zinc chelate, yellowish white; pyridoxylidenecyclohexylamine magnesium chelate, yellow; pyridoxylidenebutylamine barium chelate, yellowish brown; etc.

PART B

Preparation of pyridoxal-5'-monophosphate:

EXAMPLE I

Into a mixture of phosphoric acid anhydride (6.8 g) and 85 % orthophosphoric acid (8.5 g), pyridoxylidenebenzylamine nickel chelate (2 g) is dissolved, and the resultant solution is stirred at 40° to 45°C for 10 hours. After cooling, water (30 ml) is added thereto. The resulting mixture is stirred at 55° to 60°C for 15 minutes. After cooling, the reaction mixture is poured onto a column of cation exchange resin Dowex 50W × 8, and the column is eluted with distilled water. The eluate is concentrated under reduced pressure and allowed to stand in a refrigerator. The precipitated crystals are collected by filtration and washed with water and methanol in order to give pyridoxal-5'-monophosphate (1.25 g).

EXAMPLE II

Into a mixture of phosphoric acid anhydride (550 g) and 85 % orthophosphoric acid (685 g), pyridoxylideneethylamine nickel chelate (100 g) is dissolved, and the resultant solution is stirred at 60°C for 10 hours. After cooling, water (1,000 ml) is added thereto. The resulting mixture is stirred at 60°C for 15 minutes. After cooling, the reaction mixture is poured onto a column of cation exchange resin Dowex 50W × 8, and the column is eluted with distilled water. The eluate is concentrated under reduced pressure and allowed to stand in a refrigerator. The precipitated crystals are collected by filtration and washed with water and methanol in order to give pyridoxal-5'-monophosphate (94 g).

EXAMPLE III

Into a mixture of phosphoric acid anhydride (550 g) and 85 % orthophosphoric acid (685 g), pyridoxylideneethylamine nickel chelate (100 g) is dissolved, and the resultant solution is stirred at 80°C for 3 hours. Then, the reaction mixture is treated as in Example II to give pyridoxal-5'-monophosphate (95 g).

EXAMPLE IV

Into a mixture of phosphoric acid anhydride (17.5 g) and water (4.5 g), pyridoxylideneethylamine nickel chelate (2.5 g) is dissolved, and the resultant solution is stirred at 80°C for 2.5 hours. Then, the reaction mixture is treated as in Example II to give pyridoxal-5'-monophosphate (2.1 g).

What is claimed:

1. A process for preparing pyridoxal -5- mono phosphate which comprises the steps of reacting a pyridoxal hydrochloride or pyridoxal hydroxy sulfonic acid with a metal salt selected from the chlorides and sulfates of nickel, cobalt and iron and an amine selected from the group consisting of lower alkyl amines, cyclo (5-6 carbon alkylamines,) phenyl lower alkylamines and anilines, in water, a water miscible lower alkanol or a mixture of water and said lower alkanol to produce a reaction mixture, adjusting the pH of the reaction mixture to about 7 to 10 to precipitate from the reaction mixture a pyridoxal Schiff's base metal chelate, separating the precipitated Schiff's base metal chelate from the reaction mixture, reacting the separated precipitated pyridoxal Schiff's base metal chelate with a phosphorylating agent selected from the group consisting of a mixture of phosphoric acid and phosphoric acid anhydride, a mixture of phosphoric anhydride and water, meta phosphoric acid, a mixture of phosphorous oxychloride and water and tetrachloro pyro phosphoric acid to produce a phosphorylated Schiff's base metal chelate and heating the phosphorylated Schiff's base metal chelate with water to hydrolyze it and produce said pyridoxal-5-mono phosphate.

2. The process according to claim 1, wherein the metal salt is a nickel salt.

3. The process according to claim 1, wherein the metal salt is nickel chloride.

4. The process according to claim 1, wherein the amine is a lower alkylamine.

5. The process according to claim 1, wherein the amine is ethylamine.

6. The process according to claim 1, wherein the phosphorylation is carried out at a temperature from room temperature to about 100°C.

7. The process according to claim 1, wherein the hydrolysis is carried out at a temperature from about 50° to about 100°C.

8. The process according to claim 1, wherein the amount of metal salt used is about ½ to 1 mol of pyridoxal and the amount of the amine which is employed is not less than 1 mol of said amine per 1 mol of pyridoxal.

9. The process as described in claim 1 wherein said hydrolysis produces a hydrolysis reaction mixture containing said pyridoxal-5'-monophosphate, said process further including the step of separating the pyridoxal-5'-monophosphate from the hydrolysis reaction mixture.

10. The process as described in claim 9 wherein the pyridoxal-5'-monophosphate is separated from the hydrolysis reaction mixture by adsorbing it on a cation exchange resin, then eluting the resin with water.

* * * * *